United States Patent [19]
Flaynik, Jr. et al.

[11] Patent Number: 5,898,560
[45] Date of Patent: Apr. 27, 1999

[54] STATIC DISCHARGE DEVICE FOR ELECTRICALLY NON-CONDUCTIVE FLUIDS

[76] Inventors: Donald G. Flaynik, Jr., 24605 S. Ford Rd., Channahon, Ill. 60410; Michael R. Colburn, 1307 Trembath La., Antioch, Calif. 94553

[21] Appl. No.: 08/895,751

[22] Filed: Jul. 17, 1997

[51] Int. Cl.⁶ ................................................. H05F 3/02
[52] U.S. Cl. ............................................ 361/215; 361/212
[58] Field of Search ................................. 361/215, 216, 361/212, 220

[56] References Cited

U.S. PATENT DOCUMENTS

| | | | |
|---|---|---|---|
| 1,524,423 | 1/1925 | Chapman | 361/215 |
| 2,907,923 | 10/1959 | Short | 361/215 |
| 3,383,560 | 5/1968 | Ginsburgh | 361/215 |
| 3,629,656 | 12/1971 | Willig | 361/215 |

FOREIGN PATENT DOCUMENTS 599379  3/1978  U.S.S.R. ................ 361/215

*Primary Examiner*—Fritz Fleming
*Attorney, Agent, or Firm*—Cherskov and Flaynik

[57] ABSTRACT

A device and method for removing a static charge from electrically non-conductive fluids includes a metallic enclosure 12 that receives fluid flow therethrough, a conductive member 18 in said enclosure 12, engaging the conductive member 18 with the fluid flow and grounding the conductive member 18.

10 Claims, 8 Drawing Sheets

STATIC DISCHARGE DEVICE FOR ELECTRICALLY NON-CONDUCTIVE FLUIDS

BACKGROUND OF THE INVENTION

1. Field of the Invention

The present invention relates to a static discharge device and, more particularly, to a static discharge device for electrically non-conductive fluids.

2. Background of the Prior Art

Whenever an electrically non-conductive fluid flows in physical contact with another surface, a charge is generated in the liquid. Charge generation is especially prevalent in non-conductive fluid flows that include hydrocarbons. The more common charge generating hydrocarbons are gasoline, diesel fuel and jet fuels; however; lubricating oils can also develop a static charge via a filter utilized to clean the oil. Although a complete explanation has not been presented for the charging mechanics, it has been generally accepted that impurities present in the non-conductive fluids, especially hydrocarbons, are the cause for the static charge build-up in the fluid.

When an electrically non-conductive fluid is at rest, impurities are adsorbed along the interface between the fluid fuel and the walls containing the fluid. The impurities attach themselves to the container wall such that all negative or all positive portions of the impurities are adjacent to the wall. In FIG. 1, a container having negative portions of the impurity attach to the wall is disclosed.

The net effect of this at rest alignment is no charge buildup on the fluid. However, when the fluid begins to flow, the positive charges are swept away while the negative charges drain to ground. This results in a net positive charge to the fuel flow (see FIG. 2) in the direction of the arrow.

Had the positive portions of the impurities attached to the container wall, the result would have been a net negative charge to the fuel flow in the direction of the arrow with the positive charge draining to ground.

The impurities discussed above can be quantified in a parts per million or parts per billion context. However, depending upon the size of the container (pipe), the velocity of flow and the type of fluid, along with the quantity of the impurities, the ultimate developed charge can rise to magnitudes well beyond 1000 volts.

The static charge buildup and high voltage levels developed when an electrically non-conductive fluid fuel such as gasoline is being pumped, causes problems pertaining both to safety and performance. Safety is compromised when the charged gasoline is transported to a partially filled storage tank having a vapor portion therein that falls within an explosion range. The charged gasoline can generate a high energy spark to ground that is capable of causing an explosion with catastrophic results.

The performance of a charged fluid fuel such as gasoline is denegrated due to the inefficient mixing of the air and gas molecules within a burning chamber. More specifically, when utilizing gasoline in an internal combustion engine, air and gas are injected or mixed in a piston cylinder to provide an explosive combination that is utilized to develop power. When the gasoline has a static charge thereupon when injected into a piston cylinder, a portion of the gas does not mix with air. Instead, the "unmixed" portion becomes attracted to the grounded internal metal walls of the cylinder as well as the cylinder heads and pistons. The unmixed portion does not generate power but still burns thereby generating numerous pollutants such as hydrocarbons, carbon monoxides and nitrous oxides, or becoming a carbon deposit on the pistons, cylinder heads and/or valves.

One method to decrease the static charge buildup on hydrocarbon fluids, thereby decreasing explosions and pollution, is to install a static discharge device in the line supplying the fluid at the entrance port of a storage tank, or adjacent to an internal combustion engine that receives the fluid. The static discharge device is capable of directing the static charge from the hydrocarbon fluid safely to ground thereby providing a neutral or uncharged fluid into a receiving member.

Prior art static discharge devices for hydrocarbon fluids utilize projecting conductive rods attached to grounded inside walls of a storage tank to minimize spark and discharge the surface of the fluid to ground.

The problem with this static discharge system is that it allows a charged fluid to enter the tank instead of removing the static charge from the fluid before the fluid enters the tank.

A need exists in the art for a device that removes a static charge from a hydrocarbon fluid before the fluid enters a storage facility thereby removing the chance for sparks and explosions.

Also, a need exists in the art for a device that removes a static charge from a hydrocarbon fluid before the fluid is combined with air to generate an explosive mixture. Removing the static charge imports a more complete burn to the fluid with corresponding reductions in hydrocarbon particulate matter, carbon monoxide and nitrous oxide emissions. The device should also be relatively inexpensive to manufacture.

SUMMARY OF THE INVENTION

An object of the present invention is to provide a device and method for removing static charge from electrically non-conductive fluids that overcomes all of the disadvantages of the prior art.

It is another object of the present invention to provide a device and method for removing static charge from fluid fuel that improves the combustion characteristics of fuel. A feature of the device is the exposure of fuel to pelletized metal. An advantage of the device is the realization of increased power.

Yet another object of the present invention is to provide a device and method for removing static charge from fluid fuel that results in decreased emissions of hydrocarbons, carbon monoxide and nitrous oxides. A feature of the device is a means for removing static charge from fuel. An advantage of the device is the more complete burn of the fuel.

Still another object of the present invention is to provide a device and method for removing static charge from hydrocarbon fluids stored in a tank. A feature of the device is a means for removing surface potential from the fluid during storage. An advantage of the device is the reduced chance of a spark from the fluid surface to ground that would cause an explosion.

Other objects are to reduce the numbers of components to build a device that removes static charge from fluid fuel; to reduce the costs to construct a device for removing static charge from fluid fuel; to reduce hydrocarbon and carbon monoxides discharged from an internal combustion engine; to cause a more complete burn of a hydrocarbon fuel; to increase the power developed by an internal combustion engine; to improve safety when storing fluid fuels; and provide an apparatus for discharging fluid fuel.

The present invention provides a static discharge device for removing static charge from an electrically non-conductive fluid comprising a electrically conductive enclosure having an inlet and outlet, an electrically conductive member in said enclosure, means for engaging said electrically conductive member with said fluid; and means for grounding said electrically conductive member in said enclosure.

BRIEF DESCRIPTION OF THE DRAWINGS

These and other objects, advantages and novel features of the present invention, as well as details of an illustrative embodiment thereof, will be more fully understood from the following detailed description and attached drawings, wherein.

DETAILED DESCRIPTION OF THE PREFERRED EMBODIMENT

In the present invention a pelletized metallic element or alloy is placed in a metal casing or chamber having exposed, uncoated, and electrically conductive walls. The chamber has an inlet and outlet to allow electrically non-conductive fluids such as hydrocarbon fuels including kerosene, gasoline, diesel, natural gas and propane; or non-fuels such as lubricating oil, to pass therethrough before storing the fuel in a tank or during the operation of an internal combustion engine. The pelletized metal or alloy has a characteristic whereby a static charge build up on fluids is drained away due to the fluid making electrical contact with the metallic pellets. The pellets are irregular shaped to generate a turbulent flow from the substantially laminar flow of the fuel entering the metal chamber. The turbulent flow characteristic increases contact between the fluid and the pellets, which increases contact between statically charged fluid molecules and the pellets, which increases the quantity of charge removed from the fluid molecules thereby reducing or removing the static charge from the fluid exiting the chamber.

The draining away of the charge from the fluid fuel by the pellets is accomplished by grounding the pellets via the metal casing. The draining is aided by grounding one point of the metal casing to exterior portion of a storage tank or to an internal combustion engine or an automobile frame. Grounding the casing at one point and electrically isolating the casing from ground is accomplished by welding a grounding stud to an outer wall of the casing, then coating the entire exterior of the casing, except for the stud, with a dielectric material. One point grounding of the casing via the grounding stud insures that internal electric fields will not be generated that could detrimentally effect the operation of the device. More specifically, should the device be grounded at more than one point to different portions of the engine or automobile frame, differences in ground potential can occur that would result in an electric field within the casing. This may result in reduced static charge drainage.

Figure 1:
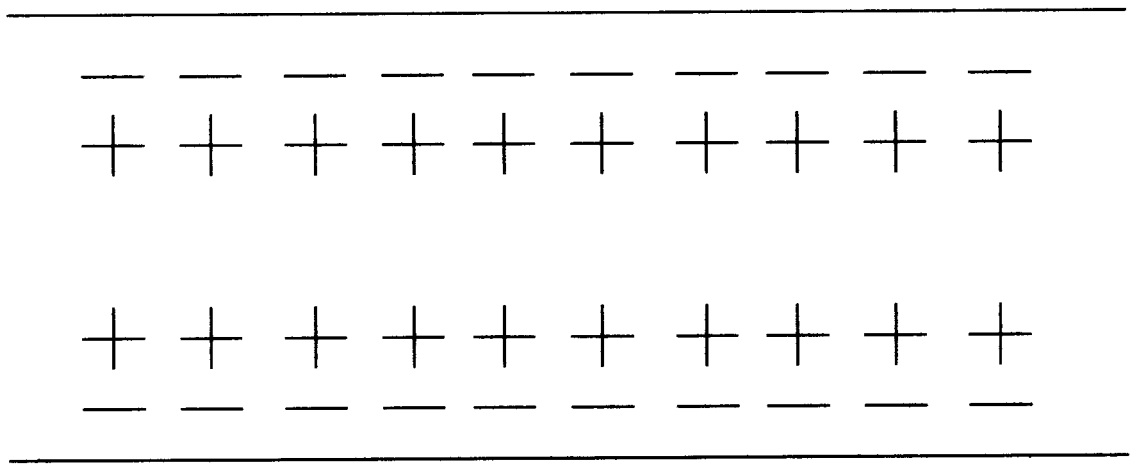
FIG. 1 is an illustration of electrical charge distribution in a non-conductive fluid at rest inside a container.
Figure 2:
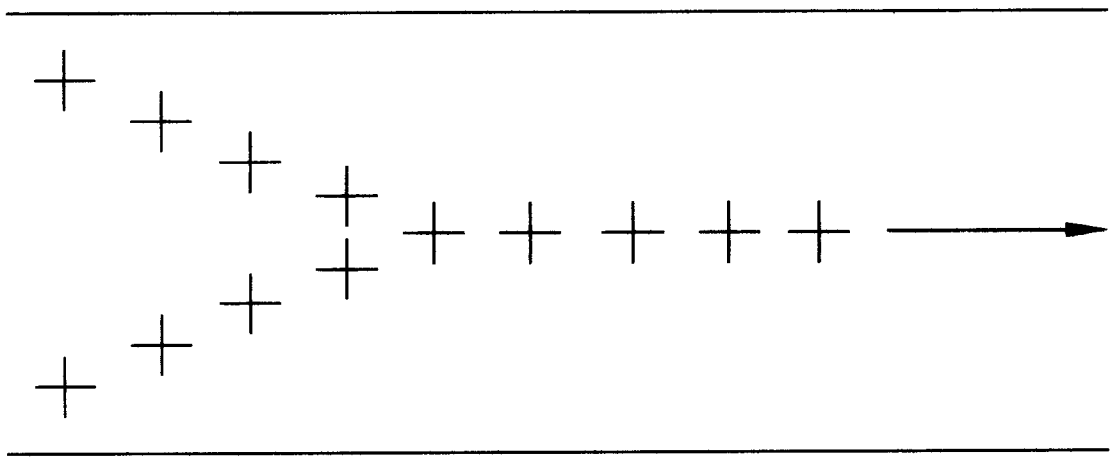
FIG. 2 is an illustration of electrical charge distribution in a non-conductive fluid flowing inside a container.
Figure 3:
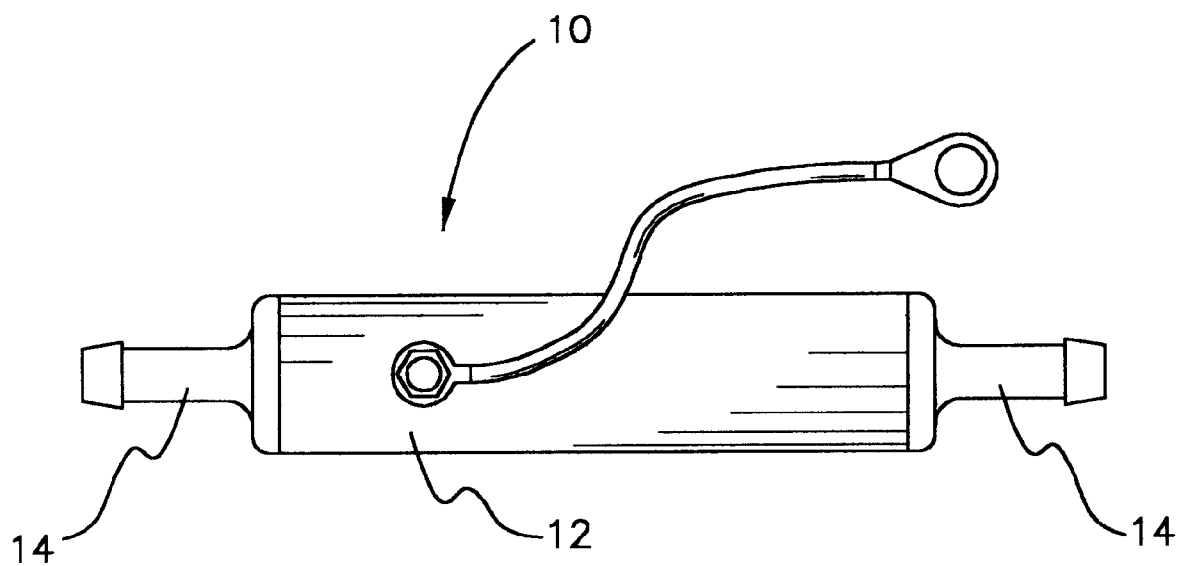
FIG. 3 is a top elevation view of a device for removing a static charge from electrically non-conductive fluids in accordance with the present invention.
Figure 4:
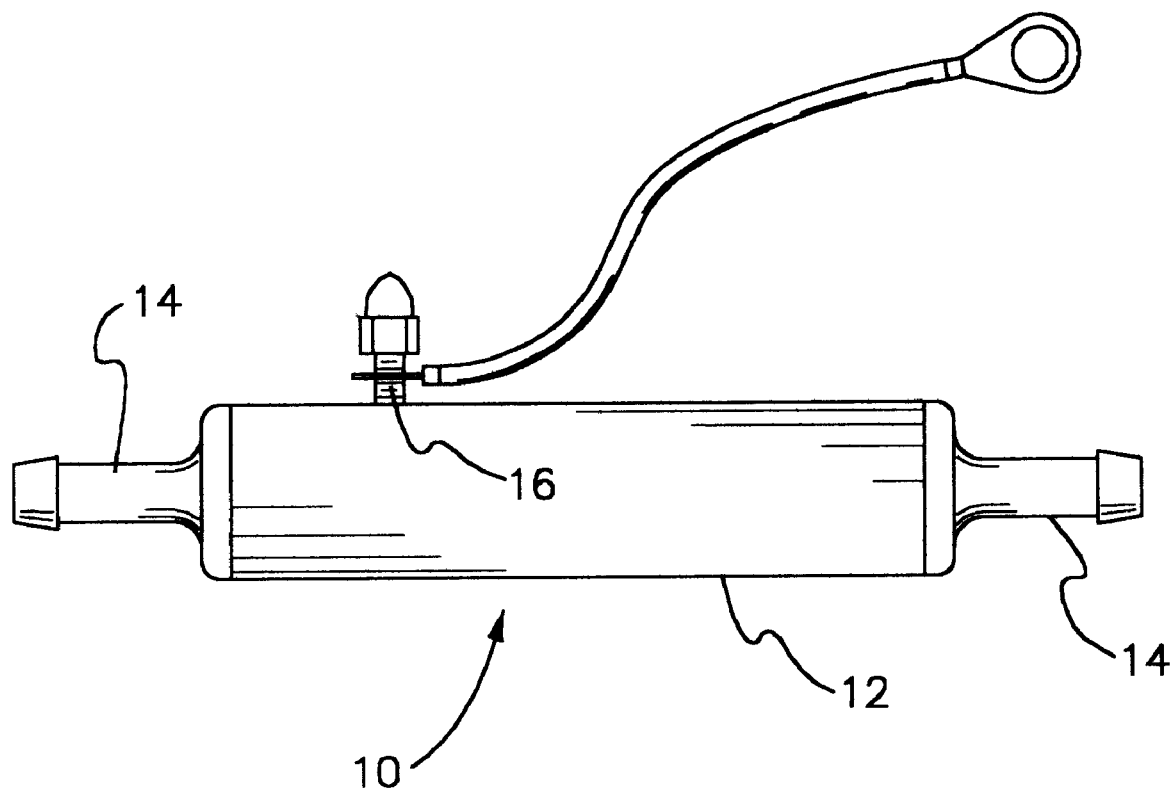
FIG. 4 is a side elevation view of a device for removing a static charge from electrically non-conductive fluids in accordance with the present invention.
Figure 5:
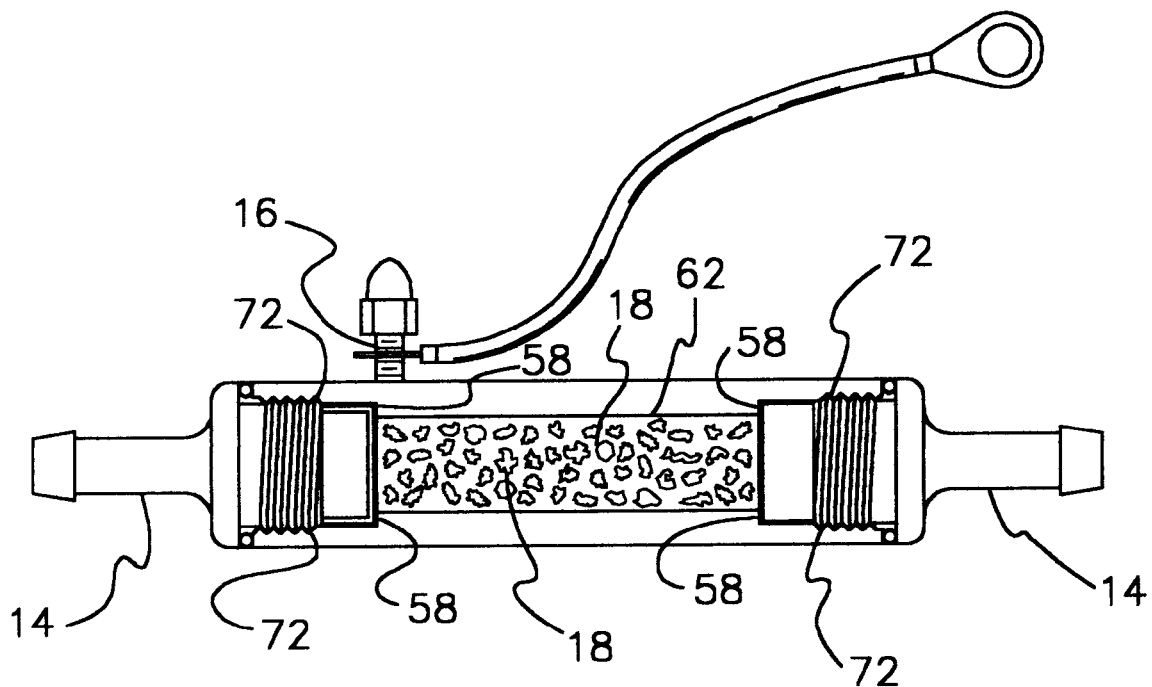
FIG. 5 is a front elevation cut away view of a device for removing a static charge from electrically non-conductive fluids in accordance with the present invention.

Referring now to FIGS. 3 through 5, a device for removing a static charge from an electrically non-conductive fluid in accordance with this invention is denoted by number 10. The device 10 includes a cylindrical housing 12, cylindrical end fittings 14, a grounding post 16, and irregular shaped metallic particles 18.

Figure 6:
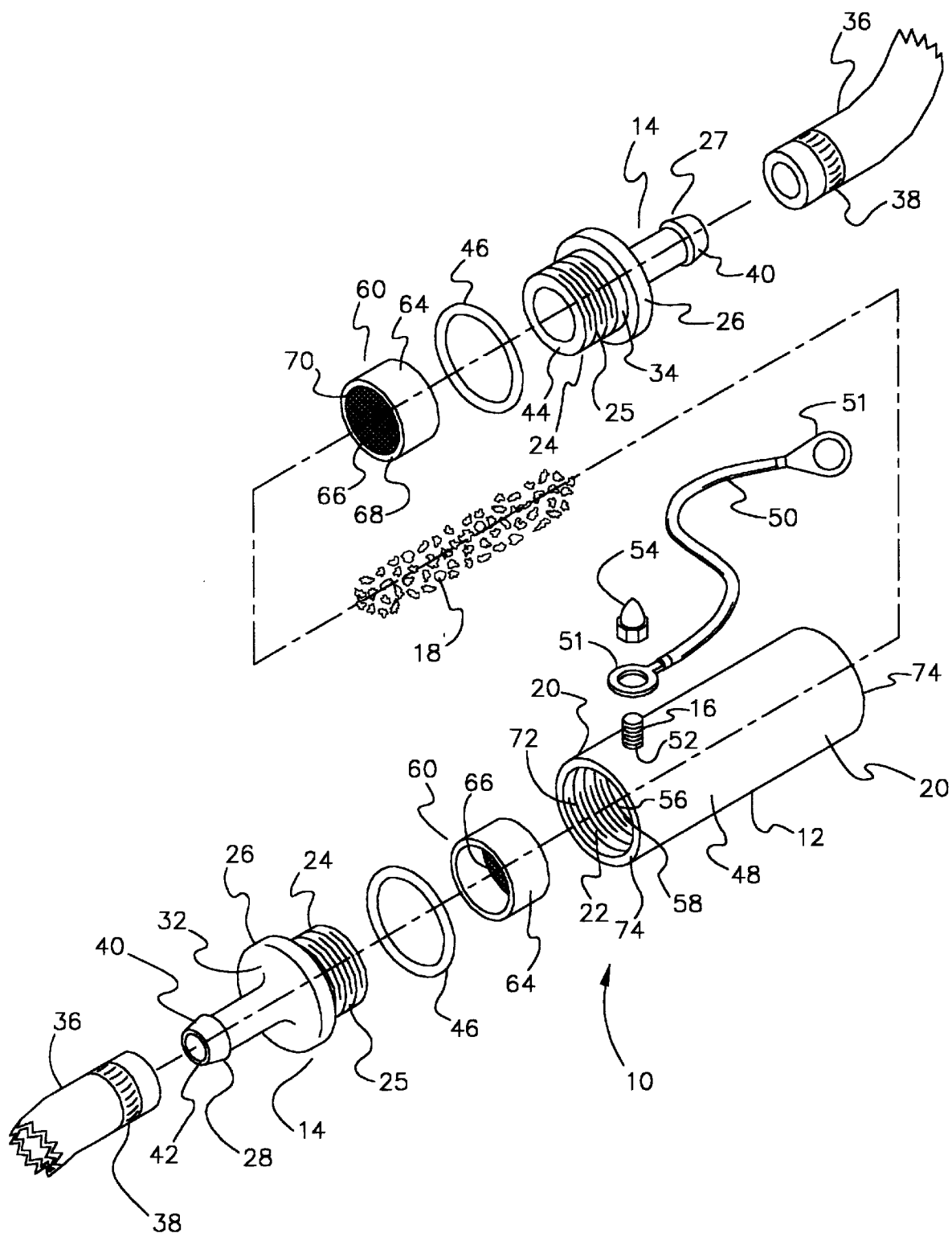
FIG. 6 is an exploded perspective view of a device for removing a static charge from electrically non-conductive fluids in accordance with the present invention.

Referring now to FIG. 6, the housing 12 is manufactured from a metallic material such as standard carbon steel pipe. Alternatively, aluminum or similar electrically conductive metal will also suffice. Housing ends 20 have multiple internal standard pipe threads 22, formed therein to receive a first end portion 24 of end fitting 14 having multiple exterior standard pipe threads 25 thereon. The housing 12 has a nominal diameter of one inch and a longitudinal dimension that varies from 2½ inches to 10 inches depending upon the size of the internal combustion engine on which the device 10 will be utilized.

Alternatively, when utilizing the device 10 in pipe lines supplying a storage tank, the diameter of the device 10 is sized to the diameter of the pipe that the device 10 is installed in. The longitudinal dimension of the device 10 is approximately three times the diameter of the device 10. Instead of end fittings 14, standard pipe coupling fittings will be used to connect each end of the device 10 to a corresponding pipe end that supplies the electrically non-conductive fluid or hydrocarbon to the storage tank.

The end fittings 14 are comprised of the same type of material that the housing 12 is fabricated as detailed above. Most preferably, the end fittings 14 are machined from a solid bar of the same carbon steel material that the housing is fabricated as detailed above. Besides the first end portion 24, the end fittings 14 include a housing cap portion 26 and tube receiving portion 28. The housing cap portion 26 has first and second side walls 30 and 32 with diameters equal to the outer diameter of the housing 12. The first side wall 30 perpendicularly joins a non-threaded section 34 of the first end portion 24 with the non-threaded section 34 having an outer diameter relatively smaller than the outer diameter of the housing cap portion 26. The second side wall 32 perpendicularly joins the tube receiving portion 28 with the tube receiving portion 28 having an outer diameter substantially smaller than the outer diameter of the second side wall 32. The tube receiving portion 28 has a longitudinal dimension sufficient to secure a flexible fuel line 36 thereupon by utilizing a hose clamp 38 and restraining ridge 40.

First end portion 24, housing cap portion 26 and tube receiving portion 28 are axially aligned with a first orifice 42 through portions 26 and 28, and a second orifice 44 through first portion 24. First and second orifices 42 and 44 are axially aligned with the second orifice 44 being substantially larger in diameter than the first orifice 42.

A flexible "O" ring 46 is required when using the end fitting 14 to assemble the device 10. The "O" ring 46 is fabricated from a pliable, flexible material such as plastic, nylon, rubber or similar material, and has an inner diameter slightly smaller than the outer diameter of the non-threaded section 34 of the first portion 24, and an outer diameter equal to the outer diameter of the housing 12. The "O" ring 46 is forcibly positioned upon the non-threaded section 34 adjacent to the first side wall 30 of the housing cap portion 26. An exemplary "O" ring 46 utilized in the device 10 is manufactured by National O-ring and distributed by Federal Mogul Co. as Part #116.

The grounding post 16 is electrically attached through welding, adhesive, male-female threaded configuration or snap-fit configurations to the outer cylindrical wall 48 of the housing 12 at a point unobtrusive to the end threads 22. The outer cylindrical wall 48 of the housing 12 is completely covered with an electrically non-conductive coating to avoid having multiple ground points on the outer wall 48. However, when the device 10 is mounted in such a way that the outer wall 48 will not make contact with any grounded objects, the non-conductive coating is not required. An exemplary coating would be a hard coat, Teflon based, anodized surface which is well known to those of ordinary skill in the art. The grounding post 16 is protected from the coating process, thereby providing electrical continuity between an uncoated inner wall 56 of the coated housing 12 and a ground wire 50 secured to the grounding post 16 via wire lugs 51, post threads 52 and securing nut 54.

The metallic particles or pellets 18 are "pea" sized irregular shaped objects manufactured from a metal that relatively easily allows static charge to be "drained" away from a non-conducting fluid flow engaging the metal. The irregular shape of the particles 18 enhances engagement between the fluid and particle 18. The more complete the engagement or "mixing" of the fluid molecules with the particles 18, the more the fluid is electrically discharged. A suitable metal is selected from the group consisting of zinc, magnesium, nickel, copper and combinations thereof A preferable metal is zinc. Another preferable metal is magnesium, alternatively, a metal alloy consisting of substantially equal amounts of nickel, copper and zinc may be utilized. The irregularly shaped particles 18 are derived from a metal drip water cooled process known to persons having ordinary skill in the art.

When using the device 10 with an internal combustion engine, the size of the housing 12 and metallic particles 18 therein will vary depending upon engine size and the corresponding fuel flows required to operate the engine. Engines utilized in motorcycles and small automobiles will require a housing having a nominal one inch diameter and a longitudinal dimension ranging from two to four inches. The metallic particles 18 will be about one-half the size of the "pea" sized particles described above. Engines utilized in medium and large sized automobiles and small trucks will require a housing having a nominal one inch diameter and a longitudinal dimension ranging from four to six inches. The particles 18 will be approximately the "pea" sized irregular shaped objects described above. Engines utilized in large racing engines and large diesel trucks will require a housing having a nominal one inch diameter and a longitudinal dimension ranging from eight to eighteen inches. The particles 18 will be about double the size of the particles 18 utilized for motorcycles and small automobiles. When using the device 10 in a supply pipe line to a storage tank, the particles 18 used for large diesel trucks are also used for storage tank installations.

The housing 12 has an inner cylindrical wall 56 extending longitudinally near each set of internal end threads 22. The inner diameter of the wall 56 is slightly smaller than the inner diameter of the end threads 22, thereby forming a slight ridge 58 that receives a plastic screen 60 that holds the particles 18 within a cavity 62 (see FIG. 5) defined by the cylindrical wall 56 and screens 60 inserted at each end 20 of the housing 12.

The screen 60 is cylindrically shaped having a cylindrical wall 64 with an outer diameter slightly smaller than the inner diameter of the housing 12 and slightly larger than the inner diameter of the ridge 58. A perforated wall 66 perpendicularly joins an edge portion 68 of the cylindrical wall 64. The perforated wall 66 has multiple apertures therethrough forming a grid pattern with each aperture being square in configuration with each side being approximately one-thirty second of an inch in length. The apertures number in sufficient quantity to allow flowing fuel to pass therethrough without affecting an internal combustion engine's operation while preventing the metallic particles 18 from escaping the housing 12. The longitudinal dimension of 64 is slightly smaller than the distance between the ridge 58 and the first internal thread (see FIG. 5) of the housing threads 22. Thus, the screen is sized to insert into an end 20 of the housing 12 until the perforated wall 66 butts against the ridge 58 while allowing the end fittings 14 to screw completely into the housing 12 without collapsing the screen 60.

When using the device 10 with an internal combustion engine, the device 10 is assembled by first inserting a screen 60 in on end of the housing 12, then screwing an end fitting 14 with an "O" ring 46 thereon into the same end of the housing 12. The metallic particles 18 are then loosely positioned inside the housing 12 until the cavity 62 is filled. A second screen 60, end fitting 14 and "O" ring 46 combination are screwed into the opposing end 20 of the housing 12 until the end fitting 14 is tightly secured to the housing 12 thereby compressing the "O" ring 46 between the first side wall 30 of the housing cap portion 26, and circular rim 74 of the housing end 20. The grounding wire 50 is then secured to the ground post 16 via securing nut 54. The device 10 is installed in a fuel line (utilizing the tube receiving portion 28 of end fitting 14, restraining ridge 40 and clamps 38) supplying an internal combustion engine at a location as close to the fuel injection component as convenience will allow. The grounding wire 50 is secured to a ground structure such as the engine or body frame near the device 10.

When using the device 10, in a supply pipeline to a storage tank, the device 10 is assembled by filling the housing 12 with the particles 18 and inserting a screen 60 in each end of the housing 12. Instead of using the end fitting 14, standard pipe nipples are screwed into each end of the device 10 thereby securing the screens 60 and the particles 18 inside the housing 12 while allowing a fluid flow to pass through the housing 12. The device 10 is installed in the pipeline supplying the storage tank as close to the tank as mechanically possible. Pipe couplings secured to pipe ends receive the nipples extending from the device 10. Standard leak prevention means such as "pipe dope" is used to prevent the fluid from seeping through the treaded pipe connections that secure the device 10 in the pipeline supplying the storage tank. The grounding wire 50 is secured to a ground structure such as the storage tank.

In operation, the device 10 receives a statically charged flowing fluid and allows the fluid to pass therethrough. The metallic particles 18, being irregularly shaped, causes the fluid flow characteristic to become turbulent, forcing virtually all the molecules of the fluid to make contact with the metallic particles 18. The contact between the flowing fluid molecules and the metallic particles 18 causes the static charge to be "drained" from the fluid to the metallic particles 18; then to the uncoated inner wall 56 of the housing 12, through the housing 12 to the grounding post 16, and ultimately through the ground wire 50 to the engine 78 or the storage tank. The non-conductive coating on the housing 12 and the single point grounding of the post 16 prevents the occurrence of multiple ground potentials within the housing 12. Multiple ground potentials could cause the housing 12 to generate electrical currents within the housing 12 structure that reduce the static discharging feature of the device 10. The statically discharged fluid molecules, once ejected into a carburetor or other air fuel mixing device, tend to vaporize and mix with air more completely, thereby providing a more homogeneous air-gas, mixture which generates more power when exploded in the cylinders of an internal combustion engine and therefore improved fuel efficiency and lower emissions. Further, the statically discharged molecules provides for safe storage in a tank when the fluid is hydrocarbon.

Figure 7:
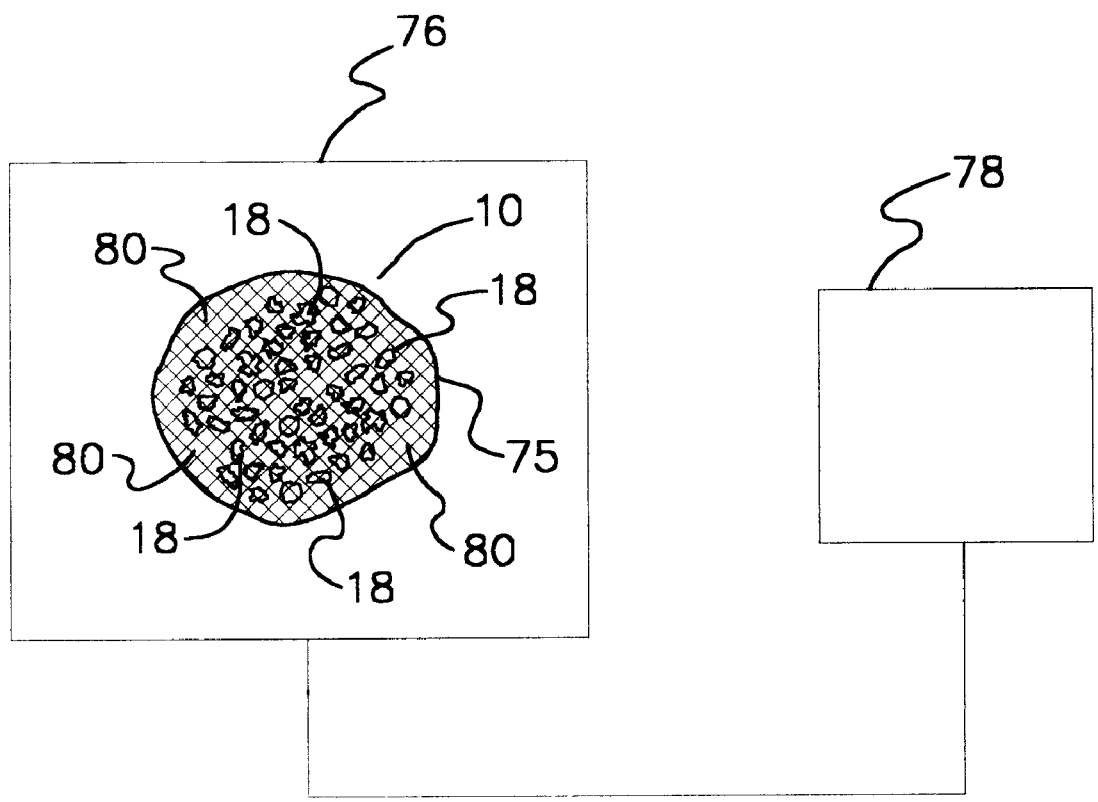
FIG. 7 is an illustration of an alternative embodiment of a device for removing a static charge from electrically non-conductive fluids in accordance with the present invention.

Referring now to FIG. 7, an alternate embodiment of the device 10 is illustrated. Rather than utilizing a separate housing 12, the metallic particles 18 are inserted into a conductive porous "sack" 75, or screen, then placed in a metallic or carbon steel fuel storage tank 76 supplying fuel to an internal combustion engine 78. The alternative embodiment is suitable when the tank 76 is in close proximity to the engine 78. The metallic tank 76 substitutes for the housing 12, the tank being grounded via physical contact with conductive mounting structures, and the conductive porous sack 75 contacting the uncoated inner wall of the tank 76, substitutes for the conductive inner wall 56 of the housing 12. The openings 80 of the sack or screen 75 must be sized to allow maximum exposure to surrounding fuel due to lower turbulent flow rates. The lower turbulent flow rates result from the large volume of fuel surrounding the sack 75 and the small volume of fuel removed from the tank 76 when operating the internal combustion engine.

Figure 8:
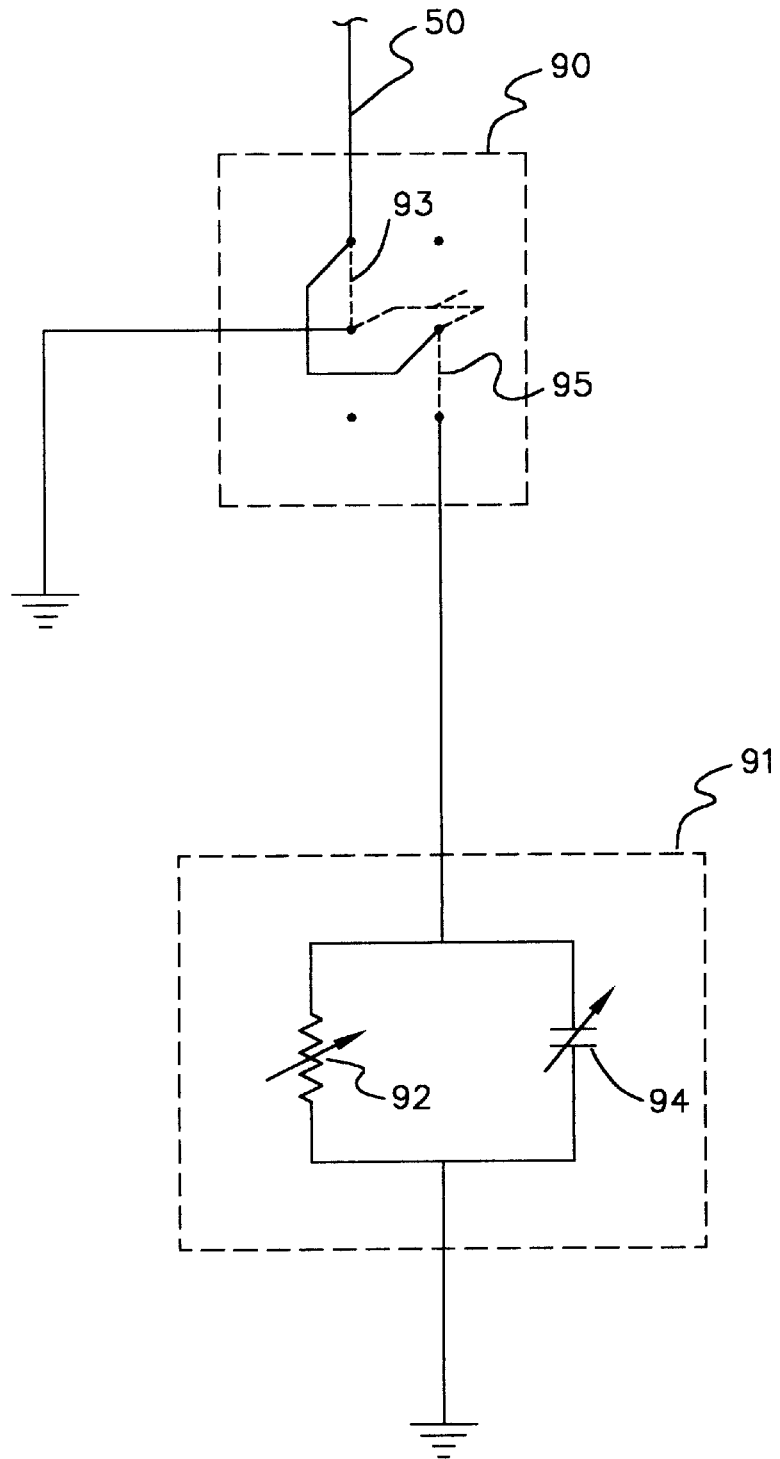
FIG. 8 is an illustration of an alternative embodiment for grounding a device for removing a static charge from electrically non-conductive fluids in accordance with the present invention.

Referring now to FIG. 8, an alternative embodiment for grounding a device for removing a static charge from fluid fuel supplying an internal combustion engine in accordance with the present invention is illustrated. A double-pole, double-throw switch 90 is shown connected to the grounding wire 50. The switch 90 has two positions. The first position 93 has the ground wire 50 connected directly to the ground. The second position 95 has the ground wire 50 connected to a regulating circuit 91 that has a variable resistor 92 and variable capacitor 94 connected in parallel. From the regulating circuit 91, the grounding wire 50 is connected directly to ground. The regulating circuit controls how quickly the static charge is dissipated to ground and therefore how efficiently the air and fuel mix.

Starting internal combustion engines during certain weather conditions may require reducing the static charge drainage and therefore less mixing between the air and fuel. This would be accomplished by placing the switch 90 in the second position 95 and bringing the variable resistor 92 and variable capacitor 94 into the grounding circuit. The greater the value of resistance and capacitance, the slower the static charge drainage and the easier the vehicle is to start in cold or damp weather. The settings of the resister 92 and capacitor 94 will vary with temperature, humidity and pressure. However, initial settings of 1 Megaohm and 1 microfarad respectively, are usually selected. The operator of the internal combustion engine will adjust these settings, which are within reach when starting the engine, as weather conditions and personal experience dictate.

Obviously, many modifications and variations of the present invention are possible in light of the above teachings. Thus it is to be understood that within the scope of the appended claims, the invention may be practiced otherwise than as specifically described above.

We claim:

1. A device for removing static charge from substantially laminar flowing electrically non-conductive fluids comprising:

an electrically conductive enclosure having an inlet and outlet;

an electrically conductive member in said enclosure;

means for engaging said electrically conductive member with said substantially laminar flowing electrically non-conductive fluids;

means for grounding said electrically conductive member and said electrically conductive enclosure; and means for converting said substantially laminar flowing electrically non-conductive fluid to a turbulent flow.

2. The device of claim 1 wherein said substantially laminar flow converting means includes means for positioning a plurality of electrically conductive particles in said enclosure lineal with said substantially laminar flowing electrically non-conductive fluid and proximate to said enclosure outlet so as to provide an obstruction to the cross-sectional area of the path of flow of said substantially laminar flowing fluid, and means for directing said substantially laminar flowing fluid through said particles in said enclosure.

3. The device of claim 1 wherein said substantially laminar flow converting means include means for filling said enclosure with electrically conductive particles.

4. The device of claim 2 wherein said directing means includes fabricating said electrically conducive particles into irregular shapes.

5. A hydrocarbon fuel treatment device comprising:

an electrically conductive enclosure having an inlet and outlet;

a plurality of electrically conductive particles in said enclosure;

means for grounding said electrically conductive particles and said electrically conductive enclosure;

means for generating a turbulent flowing hydrocarbon fuel; and means for directing said turbulent flowing hydrocarbon fuel between said plurality of electrically conductive particles.

6. The device of claim 5 wherein said generating means includes means for positioning said electrically conductive particles in said enclosure lineal with a laminar flowing hydrocarbon fuel so as to provide an obstruction to the path of flow of said laminar flowing hydrocarbon fuel.

7. The device of claim 6 wherein said electrically conductive particles engage the entire cross-sectional area of said laminar flowing hydrocarbon fuel.

8. The device of claim 5 wherein said grounding means includes means for discharging a static charge in said turbulent flowing hydrocarbon fuel.

9. The device of claim 8 wherein said discharging means includes means for controlling the rate of discharge of said static charge in said turbulent flowing hydrocarbon fuel.

10. A method for treating a laminar flowing hydrocarbon fuel comprising:

supplying an electrically conductive enclosure having an inlet and outlet;

supplying a plurality of electrically conductive particles in said enclosure;

grounding said electrically conductive enclosure and particles; converting said laminar flowing hydrocarbon fuel to a turbulent flow; and directing said turbulent flowing hydrocarbon fuel between said electrically conductive particles.

* * * * *